United States Patent
Alikhani (10) Patent No.: US 9,323,911 B1
(45) Date of Patent: Apr. 26, 2016

(54) VERIFYING REQUESTS TO REMOVE APPLICATIONS FROM A DEVICE

(71) Applicant: EMC Corporation, Hopkinton, MA (US)

(72) Inventor: Kayvan Alikhani, Oakland, CA (US)

(73) Assignee: EMC Corporation, Hopkinton, MA (US)

( * ) Notice: Subject to any disclaimer, the term of this patent is extended or adjusted under 35 U.S.C. 154(b) by 163 days.

(21) Appl. No.: 14/080,306

(22) Filed: Nov. 14, 2013

Related U.S. Application Data (63) Continuation-in-part of application No. 14/025,333, filed on Sep. 12, 2013, now Pat. No. 9,275,218, and a continuation-in-part of application No. 14/025,377, filed on Sep. 12, 2013.

(60) Provisional application No. 61/726,778, filed on Nov. 15, 2012, provisional application No. 61/726,788, filed on Nov. 15, 2012, provisional application No. 61/726,908, filed on Nov. 15, 2012.

(51) Int. Cl.
  *G06F 21/31*  (2013.01)

(52) U.S. Cl.
  CPC ..................................... *G06F 21/31* (2013.01)

(58) Field of Classification Search
  CPC ... H04L 63/20; H04L 63/102; H04L 63/0227; G06F 21/6218; G06F 21/604; G06F 21/31
  See application file for complete search history.

(56) References Cited

U.S. PATENT DOCUMENTS

| | | | |
|---|---|---|---|
| 4,449,189 A | 5/1984 | Feix et al. | |
| 4,975,969 A | 12/1990 | Tal | |
| 4,993,068 A | 2/1991 | Piosenka et al. | |
| 5,235,642 A | 8/1993 | Wobber et al. | |

(Continued)

FOREIGN PATENT DOCUMENTS

| | | |
|---|---|---|
| EP | 2385679 A1 | 11/2011 |
| WO | 2004075097 A1 | 9/2004 |

(Continued)

OTHER PUBLICATIONS

Google Play, "Battlenet Mobile Authenticator," https://play.google.com/store/apps/details?id=com.blizzard.bma&hl=en, Mar. 2012, 2 pages.

(Continued)

*Primary Examiner* — Chau Le
*Assistant Examiner* — Ghodrat Jamshidi
(74) *Attorney, Agent, or Firm* — Ryan, Mason & Lewis, LLP (57) ABSTRACT

A method comprises receiving a request to remove a given application from a first device, identifying one or more verification rules previously established by a user of the first device for processing of the removal request, sending a notification regarding said one or more verification rules, receiving verification input responsive to the notification, and granting or denying the removal request based at least in part on the received verification input. Denying the removal request comprises removing protected application data from the first device. Receiving the removal request, identifying one or more verification rules, sending the notification, receiving the verification input, and granting or denying the removal request may be implemented in a verification platform adapted for communication with the first device.

20 Claims, 8 Drawing Sheets

(56) References Cited

U.S. PATENT DOCUMENTS

| | | | |
|---|---|---|---|
| 5,761,329 | A | 6/1998 | Chen et al. |
| 6,463,474 | B1 | 10/2002 | Fuh et al. |
| 6,671,812 | B1 | 12/2003 | Balasubramaniam et al. |
| 6,724,919 | B1 | 4/2004 | Akiyama et al. |
| 6,856,800 | B1 | 2/2005 | Henry et al. |
| 7,173,604 | B2 | 2/2007 | Marvit et al. |
| 7,206,022 | B2 | 4/2007 | Miller et al. |
| 7,222,361 | B2 | 5/2007 | Kemper |
| 7,231,068 | B2 | 6/2007 | Tibor |
| 7,243,245 | B2 | 7/2007 | Pagan |
| 7,322,040 | B1 | 1/2008 | Olson et al. |
| 7,363,494 | B2 | 4/2008 | Brainard et al. |
| 7,480,655 | B2 | 1/2009 | Thomas et al. |
| 7,970,724 | B1 | 6/2011 | Hauser |
| 8,222,357 | B2 * | 7/2012 | Chen ............... 526/125.3 |
| 8,244,211 | B2 | 8/2012 | Clark |
| 8,249,577 | B2 | 8/2012 | Chmaytelli et al. |
| 8,347,370 | B2 | 1/2013 | Headley |
| 8,370,640 | B2 | 2/2013 | Adams et al. |
| 8,386,773 | B2 | 2/2013 | Sherkin et al. |
| 8,850,524 | B2 * | 9/2014 | Morris et al. ............... 726/4 |
| 2001/0047472 | A1 | 11/2001 | Huntington et al. |
| 2002/0112176 | A1 * | 8/2002 | Murray ............... 713/200 |
| 2004/0250135 | A1 | 12/2004 | Haddad et al. |
| 2005/0044044 | A1 | 2/2005 | Burger et al. |
| 2006/0137016 | A1 | 6/2006 | Margalit et al. |
| 2009/0077644 | A1 | 3/2009 | Hammell et al. |
| 2009/0309698 | A1 | 12/2009 | Headley et al. |
| 2009/0320123 | A1 | 12/2009 | Yu et al. |
| 2012/0011575 | A1 | 1/2012 | Cheswick et al. |
| 2012/0019361 | A1 | 1/2012 | Ben Ayed |
| 2012/0047563 | A1 | 2/2012 | Wheeler |
| 2012/0124662 | A1 | 5/2012 | Baca et al. |
| 2013/0055346 | A1 * | 2/2013 | Singh et al. ............... 726/3 |
| 2013/0078952 | A1 | 3/2013 | Yang |
| 2013/0144788 | A1 | 6/2013 | Sherkin et al. |

FOREIGN PATENT DOCUMENTS

| | | |
|---|---|---|
| WO | 2008094136 A1 | 8/2008 |
| WO | 2008144943 A1 | 12/2008 |
| WO | 2011157538 A1 | 12/2011 |

OTHER PUBLICATIONS

A. Bhargav-Spantzel et al., "Privacy Preserving Multi-Factor Authentication with Biometrics," 2nd ACM Workshop on Digital Identity Management (DIM), Nov. 2006, pp. 63-71.

* cited by examiner

VERIFYING REQUESTS TO REMOVE APPLICATIONS FROM A DEVICE

PRIORITY CLAIM

The present application claims the priority of U.S. Provisional Patent Application Ser. Nos. 61/726,778, 61/726,788 and 61/726,908, filed Nov. 15, 2012, which are incorporated by reference herein. The present application is also a continuation-in-part of U.S. patent application Ser. Nos. 14/025,333 and 14/025,377, filed Sep. 12, 2013, which are incorporated by reference herein. The present application is also related to commonly-assigned U.S. patent application Ser. Nos. 14/080,290 and 14/080,327, filed concurrently herewith and incorporated by reference herein.

FIELD

The field relates generally to user verification, and more particularly to techniques for verifying the identity of a user of an electronic device.

BACKGROUND

As technology grows and more information is stored electronically, it is necessary to protect the stored information. Security applications have been developed in order to verify the identity of a user. These security applications prevent a user from accessing a user account or electronic device without first providing certain user credentials. If a user cannot enter the required credentials then the user is denied access to the application or device being protected. The security application itself, however may not be secured. If a user attempts to remove the security application and is successful, the user can then access locally and possible remotely stored information.

SUMMARY

Illustrative embodiments of the present invention provide improved techniques for verification of user identity and protecting secured application data. Embodiments provide techniques for removing protected application data when an unauthorized attempt to remove a verification application or other secure application is made.

In one embodiment, a method comprises receiving a request to remove a given application from a first device, identifying one or more verification rules previously established by a user of the first device for processing of the removal request, sending a notification regarding said one or more verification rules, receiving verification input responsive to the notification, and granting or denying the removal request based at least in part on the received verification input. Denying the removal request comprises removing protected application data from the first device.

Receiving the removal request, identifying one or more verification rules, sending the notification, receiving the verification input, and granting or denying the removal request may be implemented in a verification platform adapted for communication with the first device.

In another embodiment, a method comprises receiving a request from a user to remove a given application from a first device, sending the removal request to a verification platform, removing the given application responsive to the verification platform granting the removal request, and removing protected application data from the first device responsive to the verification platform denying the removal request. The verification platform grants or denies the removal request based at least in part on verification input, the verification input being based on one or more verification rules previously established by a user of the first device for processing of the removal request.

All illustrations of the drawings are for the purpose of describing exemplary embodiments of the present invention and are not intended to limit the scope of the present invention in any way.

DETAILED DESCRIPTION

Illustrative embodiments of the present invention will be described herein with reference to exemplary systems and associated verification platforms, user devices and other processing devices. It is to be appreciated, however, that the invention is not restricted to use with the particular illustrative system and device configurations shown. Accordingly, the term "communication system" as used herein is intended to be broadly construed, so as to encompass, for example, systems in which a single user device communicates with another processing device associated with a verification platform, systems in which at least two user devices each communicate with another processing device associated with a verification platform, and other types of systems.

Embodiments provide means for removing protected application data when an unauthorized attempt to remove a verification application is made. The verification application and one or more watcher applications are run on one or more electronic devices. When an attempt is made to remove the verification application, the watcher application notifies another watcher application or a verification platform. Alternatively, an attempt to remove one watcher application causes that watcher application to notify another watcher application or verification platform. A user is then required to perform rules-based verification in order to continue with the application removal. If verification fails, then all locally stored protected application data is removed from the electronic device. The rules-based verification is also use to verify the identity of a user when a protected application is launched.

The term "watcher application" as used herein refers to an application that is configured to monitor the status of another application. A watcher application detects user attempts to remove or stop another application, and notifies another watcher application to determine whether to grant or deny an attempt to remove or stop the application. In some embodiments, only a single watcher application capable of both detecting attempts to remove and stop applications and taking remedial action such as notifying a verification platform to determine whether to grant or deny such attempts.

A number of embodiments of the invention will be described with reference to the flow diagrams of FIGS. 1-6 and the communication system diagram of FIG. 7. A given such embodiment implements rules-based multi-factor verification of user identity using a verification service that is supported by a verification platform. The verification service interacts with a verification application installed on at least one user device. In some embodiments, the rules-based multi-factor verification utilizes only a single user device, while in other embodiments the rules-based multi-factor verification utilizes first and second user devices, also referred to herein as primary and secondary devices. Such devices in arrangements of the latter type may be considered examples of what are more generally referred to herein as simply first and second devices. Also, other embodiments can be adapted to utilize three or more user devices to perform identity verification.

Except otherwise noted, it will be assumed for description of the flowcharts of FIGS. 1 through 6 that the rules-based multi-factor verification utilizes two user devices, also referred to as first and second devices. The first and second devices may be viewed as the primary and secondary devices denoted in the exemplary system of FIG. 7. However, it will be apparent to those skilled in the art that the described arrangements can be adapted in a straightforward manner for use with only a single device, or with three or more devices.

The verification service is implemented using a verification platform that illustratively includes a verification platform application programming interface (API) and a verification platform server. The verification platform API supports communication with a verification agent implemented on the primary and secondary devices.

In the present embodiment, the primary and secondary devices must be enrolled with a verification service in order to utilize the method to monitor and verify user attempted removal, stoppage or uninstallation of secure applications, verification applications and/or watcher applications from electronic devices. The user or administrator of a system chooses or provisions a secondary electronic device on which to perform rules-based verification. As noted above, however, in some embodiments only a single device is used.

Figure 1:
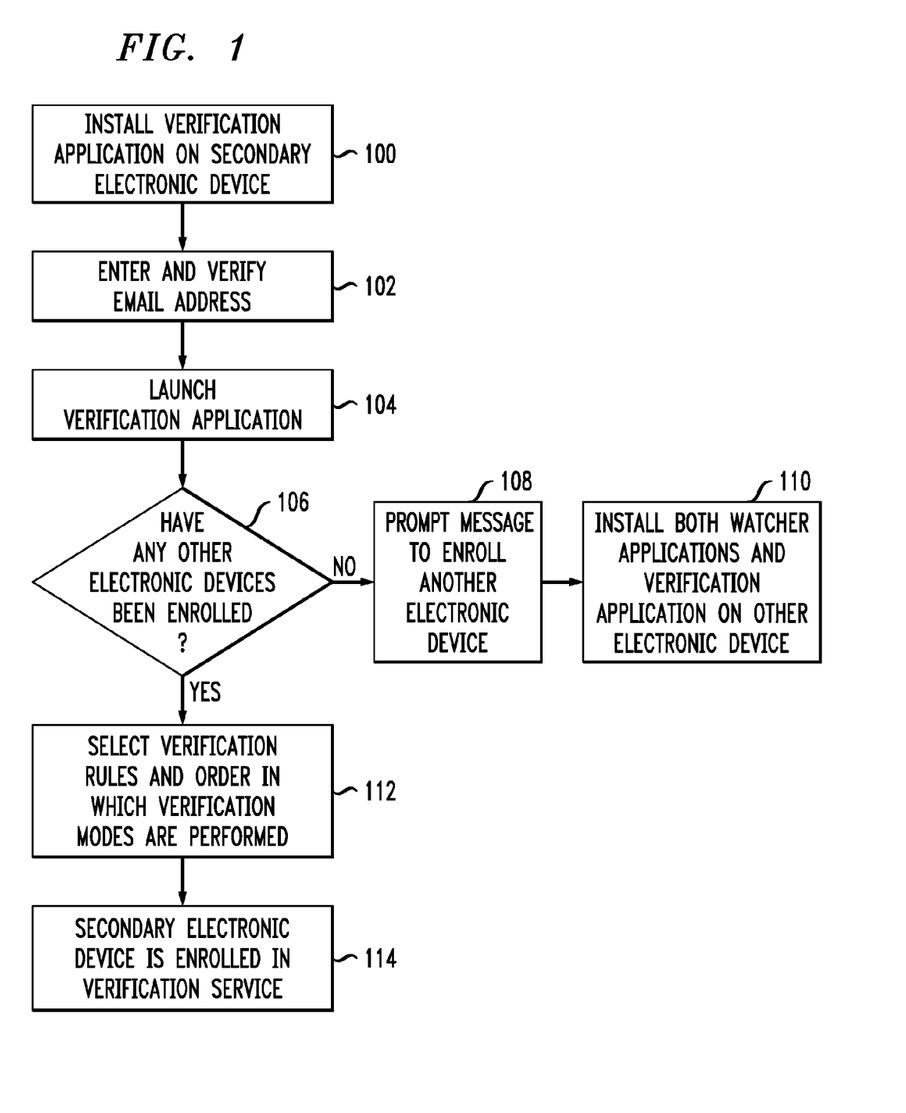
FIG. 1 is a flowchart illustrating verification service enrollment on a secondary device.

An exemplary enrollment process for the secondary device is shown in FIG. 1. This process includes steps 100 through 114. In step 100, a verification application is installed on the secondary device. Once the verification application has been installed, the user registers an email address and goes through an email verification process in step 102. When the email address has been verified the secondary electronic device is enrolled with the verification service and the verification application is launched in step 104. More generally, a user may register with the verification service using a user identification. In some embodiments, the user identification may be the same as or different from the user's email address.

The verification application then searches for any other user enrolled electronic devices. A determination is made in step 106 whether any other device is enrolled. If no other electronic device is enrolled, the verification application prompts the user to enroll another electronic device in step 108. Next both watcher applications and a verification application are installed on the other electronic device is step 110.

If a determination is made in step 106 that another device is enrolled, the user is prompted to select a desired set of verification rules as well as the order in which modes of verification are carried out in step 112. It is possible for verification modes to be used in conjunction with one another or for a verification mode to act as a failsafe when another verification mode cannot be completed. For example, a user could choose to require both face and voice verification. In this case both modes of verification must be satisfied in order to gain access to the protected application. Alternatively, a user could require face or voice verification. In this case face verification would be attempted first and in the event that verification fails or cannot be performed, the device would attempt to authorize access using voice verification.

The number of verification modes, the sequence of verification modes used and the types of verification can be selected based on the desired level of protection. The methods used for verification include, by way of example, voice verification, face verification, live verification, location verification and motion verification. Various other modes of verification may be used in addition to or as an alternative to these modes of verification.

These verification methods are more generally referred to herein as distinct "types" of verification. By way of example, the user can select the types of verification he or she would like to use from a displayed list, and can also configure the particular manner in which the different types of verification are to be applied. The latter may involve the user specifying logic functions such as AND and OR between selected verification types that indicate the manner in which the selected verification types should be applied.

For example, a user could choose to require both face and voice verification to access a given secure application. In this case, the user selects the two verification types and specifies that they are to be applied in accordance with a logic AND function, such that both verification types must be satisfied in order to gain access to the secure application. Alternatively, the user could require face or voice verification. In this case, the user selects the two verification types and specifies that they are to be applied in accordance with a logic OR function, such that face verification would be attempted first and in the event that face verification fails, the device would attempt to authorize access using voice verification.

Such specifications are examples of what are more generally referred to herein as one or more "verification rules" established by a user. A given such verification rule or set of verification rules generally specifies multiple distinct types of verification selected by the user, and a sequence in which the selected verification types are to be applied in processing the verification request. Thus, the selection step 112 in the exemplary FIG. 1 process may be viewed as a user establishing one or more verification rules for rules-based multi-factor verification.

After selecting the verification rules and the order in which the verification rules are performed in step 112, the secondary device is enrolled in the verification service in step 114. In some embodiments, alternative enrollment processes may be used. For example, the selection of particular verification types and the sequence in which those types should be applied can be managed through a web-based administrative interface. Such management can be used to generate verification rules for a given user or for groups of multiple users and may further involve adding or removing users from particular groups or otherwise updating verification rules responsive to user input or designated policies. These and other provisioning functions may therefore be performed by a user or a system administrator.

Figure 2:
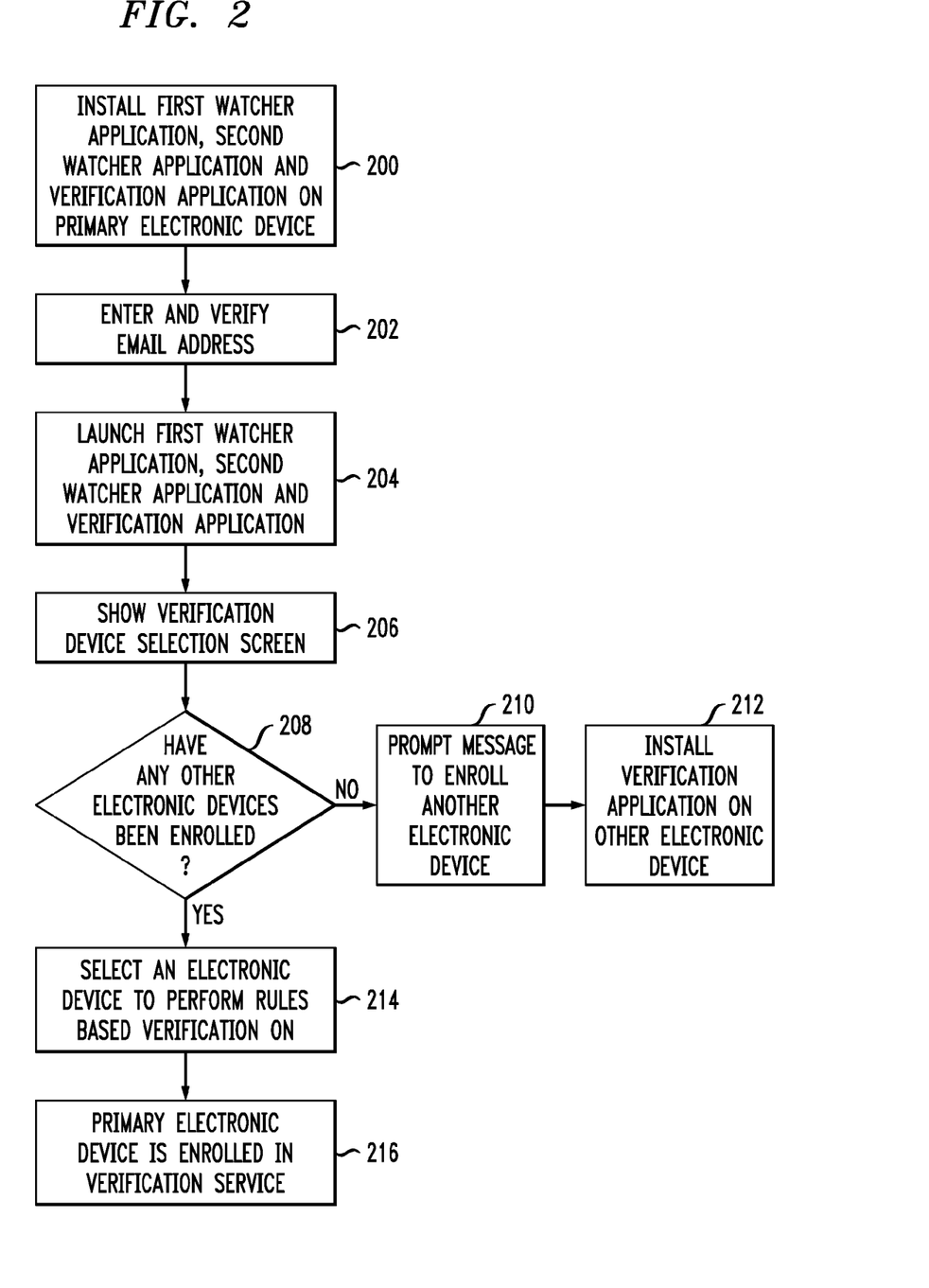
FIG. 2 is a flowchart illustrating verification service enrollment on a primary device.

FIG. 2 shows an enrollment process for the primary electronic device. This process includes steps 200 through 216. In step 200, the first watcher application, second watcher application and verification application are installed on the primary device. After installing the watcher applications and the verification application, the user is prompted to enter and verify an email address in step 202. The email address should be the same email address as that used to enroll the secondary device.

In step 204, the first verification application, first watcher application and second watcher application are launched. The user is then prompted in step 206 to select the electronic device on which the user would like to perform rules-based verification for the primary device. In step 208, a determination is made as to whether any other electronic device is enrolled for that user. If no other devices are enrolled, the user is prompted to enroll another device in step 210. Then in step 212 the verification application is installed on the other device.

If a determination is made in step 208 that one or more other devices are enrolled, the user is prompted to select one of the other electronic devices to perform rules-based verification on in step 214. For example, the user may select the secondary device enrolled via the enrollment process described above with respect to FIG. 1. In other embodiments, the user selects the primary device for performing the rules-based verification. The primary device is then enrolled in the verification service in step 116.

Although enrollment was described above where the secondary device was enrolled prior to the primary device, embodiments of the invention are not limited to this arrangement. For example, a primary device may be enrolled prior to the secondary device. In other embodiments, only a single device associated with a user is enrolled in the verification service.

Figure 3:
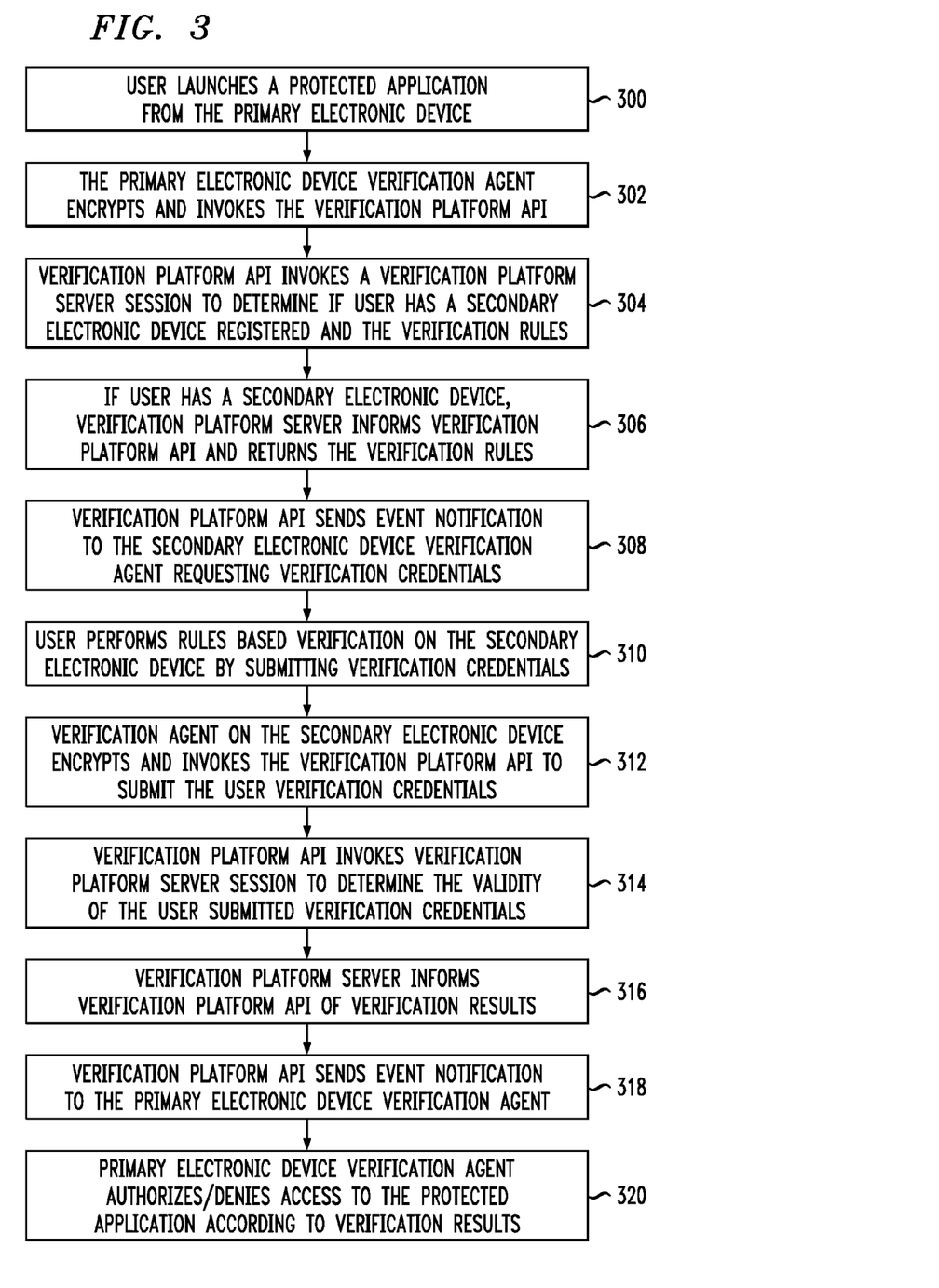
FIG. 3 is a flowchart illustrating protection of a verification application

FIG. 3 shows a process for protection of a verification application. A user who has enrolled primary and secondary devices with the verification service launches a protected application on the primary device in step 300. The protected application is an example of a secure application, as access to the secure or protected application is conditioned on satisfactory completion of a rules-based verification process.

The verification applications are installed on both the primary and secondary devices, and run in the background on the devices. Protected applications are run on the primary device, while the secondary device is used to submit verification credentials for the protected applications. When a user attempts to launch a protected application on the primary device, the verification agent of the primary device intercepts the protected application launch. The verification agent of the primary device encrypts and invokes the verification platform API to determine the secondary device and the rules that control the launch of the protected application in step 302.

The verification agent may also intercept events and transactions on the primary device other than the launch of a protected application. For example, the verification agent may intercept an attempt to perform a particular action within a secure application rather than on attempted launch of the secure application. While described herein primarily with respect to intercepting the launch of protected applications, embodiments are not limited solely to this context. Instead, a verification agent may more generally intercept or require verification for various other events, transactions, etc.

In step 304, the verification platform API invokes a verification platform server session to determine if the user of the primary device has a secondary device that is registered, as well as the verification rules. If the user has a secondary device, the verification platform server informs the verification platform API and returns the verification rules in step 306. The verification rules are forwarded to the secondary device to perform the rules-based verification. In step 308, the verification platform API sends an event notification to the verification agent on the secondary device requesting verification credentials. The requested verification credentials are based on the rules-based verification selected by the user.

The user then performs rules-based verification on the second device by submitting the verification credentials in step 310. The user performs the required methods of verification on the secondary device to submit the verification credentials. The verification agent of the secondary device encrypts and invokes the verification platform API to submit the user verification credentials in step 312. In step 314, the verification platform API invokes the verification platform server session to determine the validity of the user submitted verification credentials. The server compares the submitted verification credentials to stored verification data to determine the authenticity of the submitted verification credentials. The verification platform server then informs the verification platform API of the verification results in step 316.

The verification platform API then sends an event notification to the primary device verification agent in step 318. In step 320, the primary device verification agent authorizes or denies access to the protected application according to the verification results.

Figure 4:
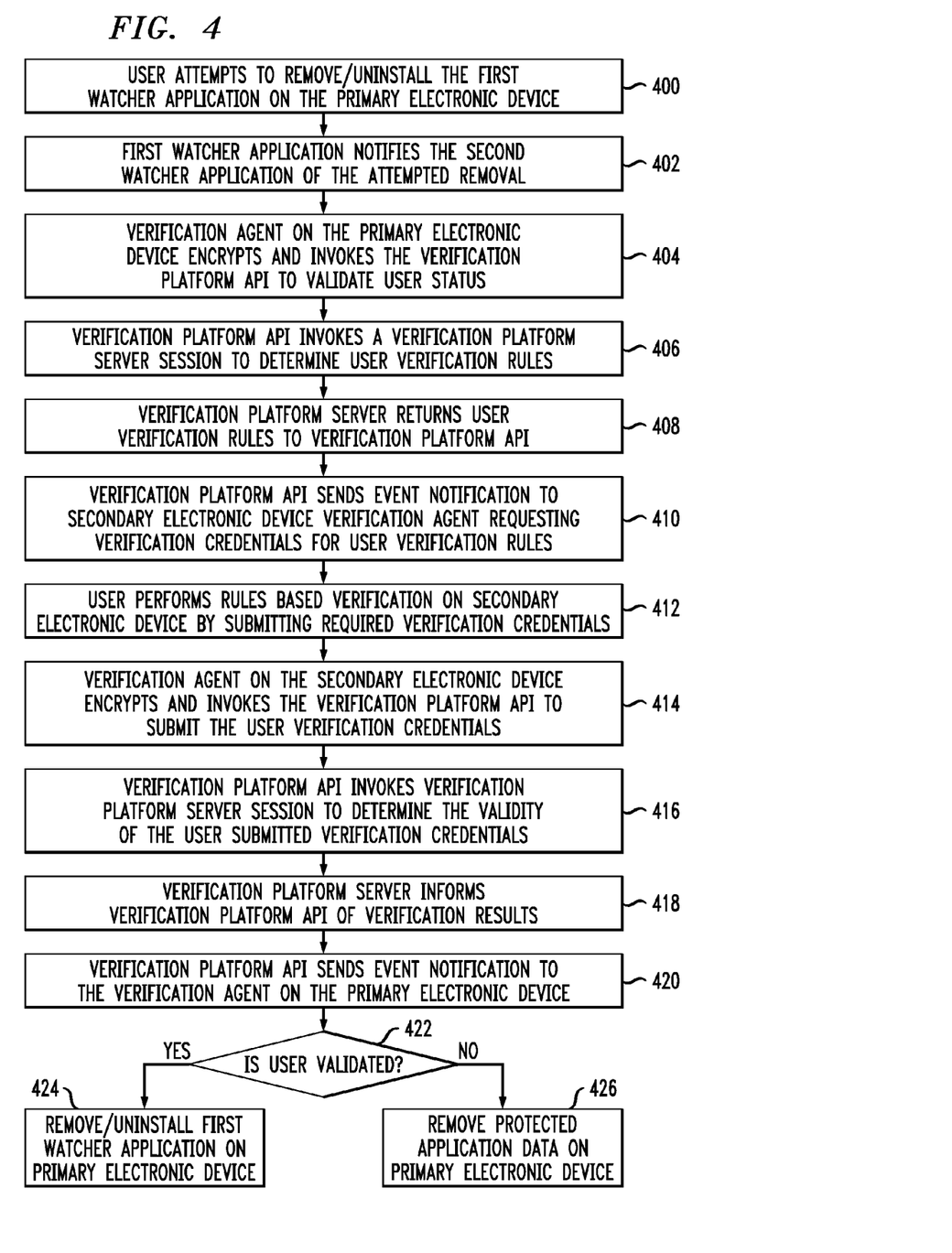
FIG. 4 is a flowchart illustrating protection of a watcher application.

FIG. 4 illustrates a process for protection of a watcher application. A first watcher application and a second watcher application also run in the background on the primary device. The first and second watcher applications prevent unauthorized removal or stoppage of the verification application, other watcher applications, or other designated applications. In step 400, a user attempts to remove or uninstall the first watcher application on the primary device. The first watcher application in step 402 then notifies the second watcher application of the attempted removal.

The second watcher application then checks for user validation status. In step 404, the verification agent on the primary device encrypts and invokes the verification platform API to validate user status. The verification platform API in step 406 invokes a verification platform server session to determine the user verification rules. The verification platform server retrieves the verification rules for the user, and returns the user verification rules to the verification platform API in step 408.

Next, the verification platform API sends an event notification to the secondary device verification agent requesting the verification credentials for the user verification rules in step 410. The user is then prompted to perform the required methods of verification on the secondary device. The user performs rules-based verification on the second device by submitting the required verification credentials in step 412. The verification agent of the secondary device then sends the submitted verification credentials to the verification platform server by encrypting and invoking the verification platform API to submit the user verification credentials in step 414.

In step 416, the verification platform API invokes the verification platform server session to determine the validity of the user submitted verification credentials. The verification platform server compares the submitted verification credentials to stored verification data for the user. The verification platform server then informs the verification platform API of the verification results in step 418. The verification platform API in turn forwards the verification results to the verification agent on the primary device in step 420.

If the user is successfully validated in step 422, then the first watcher application is removed or uninstalled from the primary device in step 424. If the user is not successfully validated in step 422, protected application data is removed from the primary device in step 426. In some embodiments, when the user is not successfully validated in step 422 further action is taken on the primary device. For example, a password for the primary device may be changed or reset. As another example, the primary device may be locked or rebooted.

While FIG. 4 describes the attempted removal or uninstallation of the first watcher application, similar processes are used on an attempted removal or uninstallation of the second watcher application and/or the verification application on the primary device. It is also possible for only the primary device to be used. In such embodiments, the rules-based verification is performed on the primary device as opposed to a secondary device.

The first and second watcher applications can also provide automatic restart services. If an attempt is made to stop the first watcher application, then the primary device's operating system is instructed to restart the first watcher application. In the event that the primary device operating system cannot restart the first watcher application, the second watcher application will restart the first watcher application. Similarly, if an attempt is made to stop the second watcher application, then the primary device's operating system will attempt to restart the second watcher application. In the event that the primary device's operating system cannot restart the second watcher application, the first watcher application will restart the second watcher application.

Figure 5:
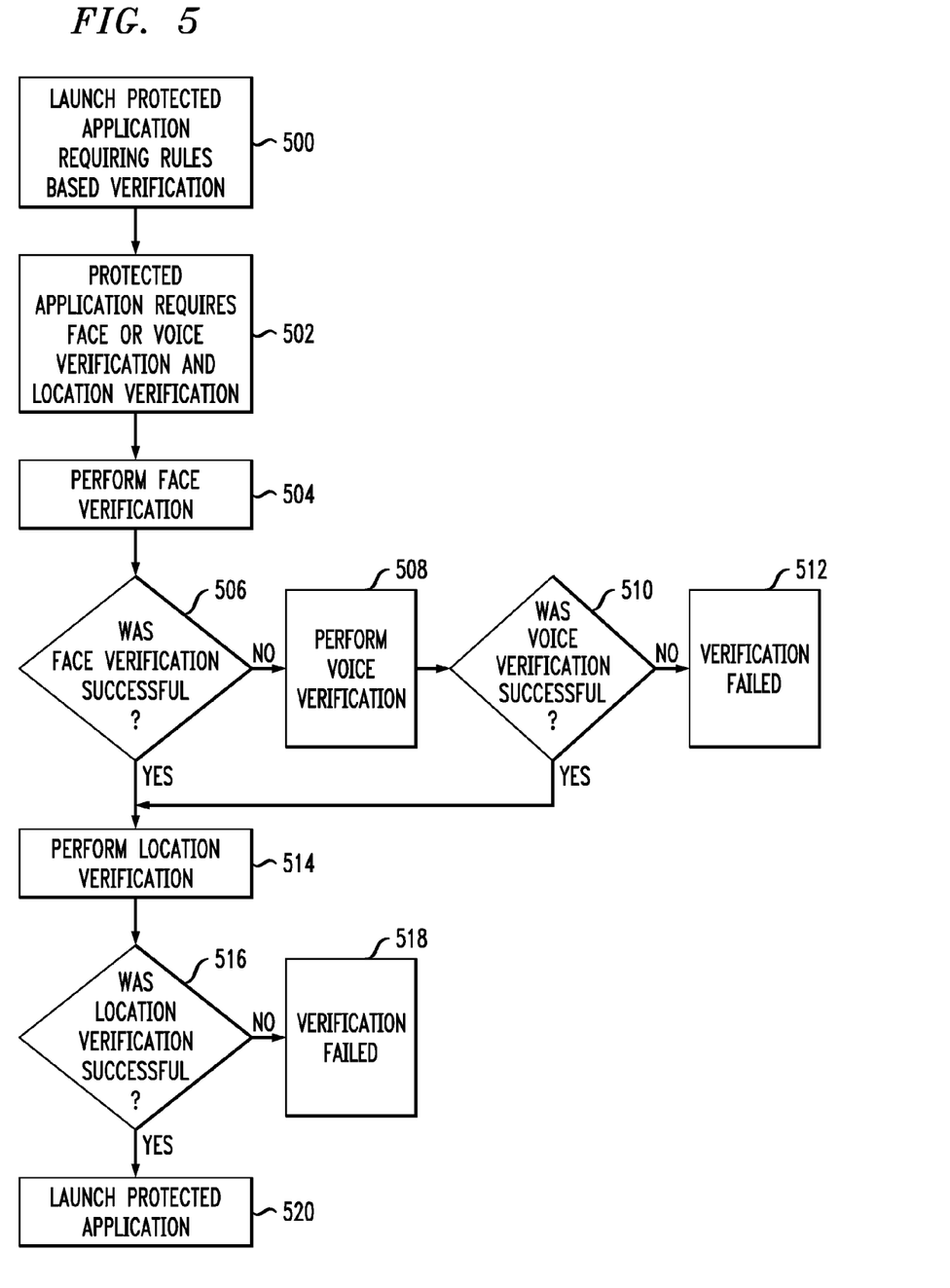
FIG. 5 is a flowchart illustrating a rules-based verification method.
Figure 6:
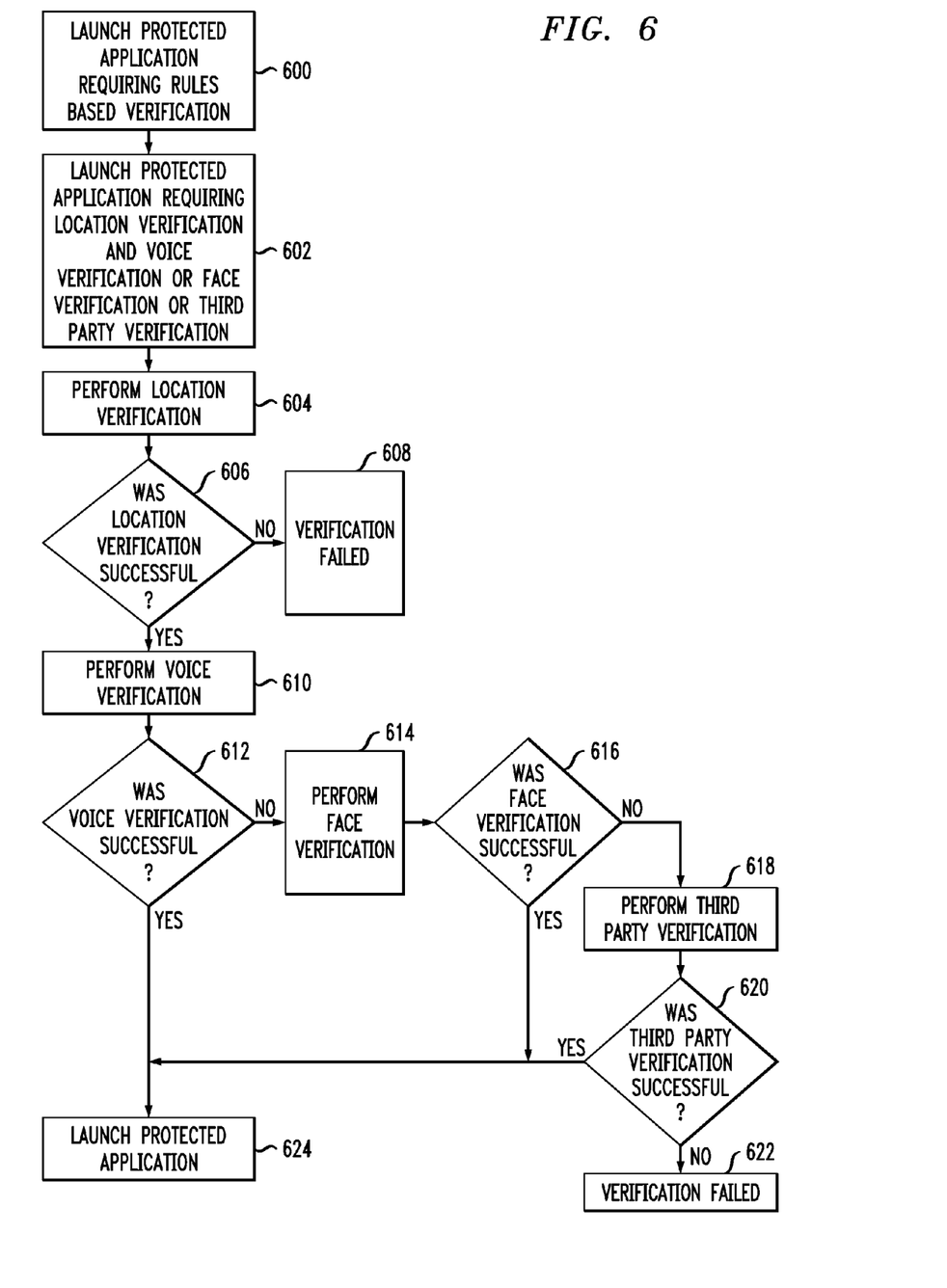
FIG. 6 is a flowchart illustrating another rules-based verification method.

FIGS. 5 and 6 show two examples of rules-based verification methods for verifying user-attempted removal of applications from electronic devices. It is to be appreciated, however, that various other examples of rules-based verification are possible using different combinations of verification rules, modes, etc. Using logical AND/OR syntax, any combination of verification modes can be used depending on the level of security desired. Using the logical AND, a user can determine the number of levels of security required to be passed in order for verification to be successful. Using the logical OR, a user can determine the number of fallback verification methods used for each level of verification. Rules-based verification syntax is read from left to right and can incorporate parenthesis to group verification modes together.

FIG. 5 shows a rules-based verification process in which face or voice verification is required in addition to location verification. The process begins with step 500, where the user attempts to launch a protected application requiring rules-based verification. In some embodiments, step 500 comprise a user attempting to remove or uninstall a protected application, the verification application or a watcher application.

In step 502, it is determined that the protected application requires face OR voice verification AND location verification. Thus, the process has two levels of security. The first level is face or voice verification, and the second level is location verification. Face verification is performed in step 504. In step 506, a determination is made as to whether the face verification was successful. If the face verification was not successful, the process proceeds to step 508 where voice verification is performed. In step 510 a determination is made as to whether the voice verification was successful. If the voice verification was not successful, then verification fails in step 512.

If the face verification is determined to be successful in step 506 or if the voice verification is determined to be successful in step 510, location verification is performed in step 514. Next, a determination is made as to whether the location verification was successful in step 516. If the location verification is not successful, then verification fails in step 518. If the location verification is successful, then the verification succeeds and the protected application is launched in step 520.

FIG. 6 shows another example of a rules-based verification process. In step 600, a user launches an application that requires rules-based verification. In some embodiments, step 600 comprise a user attempting to remove or uninstall a protected application, the verification application or a watcher application. In step 602, the protected application is determined to require location verification AND voice verification OR face verification OR third party verification. Thus, the process has two levels of security. The first level of security is location verification while the second level of security is voice or face or third party verification. The second level of security has two fallback verification methods, namely, face verification and third party verification.

Location verification is performed in step 604. In step 606, a determination is made as to whether the location verification was successful. If the location verification is not successful, then verification fails in step 608. If the location verification is successful, voice verification is performed in step 610. Next, a determination is made in step 612 as to whether the voice verification was successful. If the voice verification fails, then face verification is performed in step 614.

In step 616, a determination is made as to whether the face verification was successful. If the face verification is not successful, then third party verification is performed in step 618. A determination is then made in step 610 as to whether the third party verification was successful. If the third party verification is not successful, then verification fails in step 622. If voice verification, face verification or third party verification is successful, then the protected application is launched in step 624.

Communications between the verification agent and the verification platform API may utilize one or more of JavaScript Object Notation syntax, REpresentational State Transfer (REST) based client-server architecture and mutual client-server certificate-based encryption and authentication.

As a more particular example of communications of the latter type, a verification application acting as a client provides a certificate to the verification platform server and the server provides its certificate to the client. Both certificates are verified using a certificate authority, which has signed both the client and server certificates. The information is transmitted between the client and server over a Secure Socket Layer (SSL), using 128 bit or 256 bit Advanced Encryption Standard (AES) cipher encryption. The cipher encryption strength may be selected at least in part as a function of parameters such as device operating system type and transport capabilities, as well as other factors influencing the ability of a given device to support the desired encryption level.

It should be understood that the above-noted communication types are only examples, and numerous other communications may be used in other embodiments. Additional details regarding the above-noted AES techniques as well as examples of other cryptographic techniques suitable for use in providing secure communications in embodiments of the invention can be found in A. J. Menezes et al., Handbook of Applied Cryptography, CRC Press, 1997, which is incorporated by reference herein.

As indicated above, a wide variety of different verification types may be made available for user selection as part of one or more verification rules in a given embodiment of the invention.

It is to be appreciated that processing operations and other system functionality such as that described in conjunction with FIGS. 1 through 6 can be implemented at least in part in the form of one or more software programs stored in memory and executed by a processor of a processing device such as a computer or server. As will be described below, a memory or other storage device having such program code embodied therein is an example of what is more generally referred to herein as a "processor-readable storage medium."

Also, the particular processing operations and other system functionality described in conjunction with the flowcharts of FIGS. 1 through 6 are presented by way of illustrative example only, and should not be construed as limiting the scope of the invention in any way. Alternative embodiments can use other types of processing operations for rules-based multi-factor verification or other types of verification of user identity implemented using one or more user devices and a verification platform. For example, the ordering of the process steps may be varied in other embodiments, or certain steps may be performed concurrently with one another rather than serially.

It was noted above that in some embodiments, two or more user devices are utilized. If two devices are used for verification then the two devices need not communicate with one another directly but instead can communicate through a verification platform.

Figure 7:
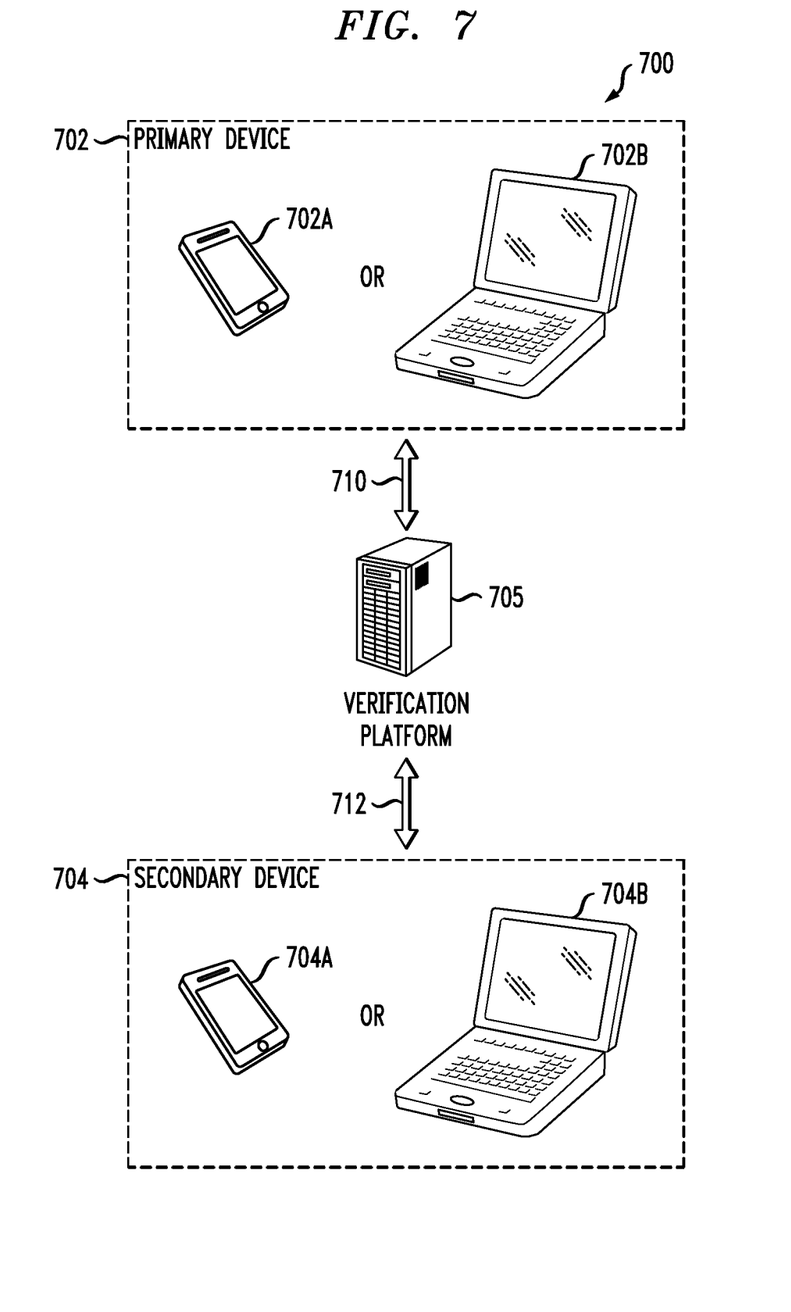
FIG. 7 shows an exemplary communication system comprising primary and secondary devices that communicate with a verification platform supporting the verification service.

An exemplary communication system in an embodiment of this type is shown in FIG. 7. In this embodiment, a communication system 700 comprises a primary device 702, a secondary device 704 and a verification platform 705 arranged between the primary and secondary devices. The verification platform 705 communicates with the primary and secondary devices 702 and 704 via respective communication channels 710 and 712. In the present embodiment, there is no pairing or other direct communication required between the primary and secondary devices. The primary device 702 is illustratively shown as comprising one of a mobile telephone 702A or a laptop computer 702B. Similarly, the secondary device 704 is illustratively shown as comprising one of a mobile telephone 704A or a laptop computer 704B. A wide variety of other types of electronic devices may be used in other embodiments, including by way of example tablets, smart watches, desktops, and various other processing and computing devices.

The primary device 702 and the secondary device 704 are both configured to run the rules-based multi-factor verification application and watcher applications.

The verification platform 705 is configured to include a verification platform API and a verification platform server as noted above, but may comprise additional or alternative components in other embodiments.

In the FIG. 7 embodiment, a verification request is sent from the primary device 702 and processed by the verification platform 705 to determine an appropriate notification to send to the secondary device 704. The secondary device is used to provide verification input to the verification platform responsive to the notification and in accordance with the selected verification types so as to thereby control access to an application on the primary device. It is assumed that verification agents of the type previously described run on both the primary and secondary devices, and information is sent from a given such verification agent to the verification platform API in encrypted form. The verification platform API communicates with the verification platform server to determine one or more verification rules and to process verification input in the manner previously described.

The use of the verification platform as an intermediary between the primary and secondary devices allows for enhanced communication security, thereby reducing vulnerability to hacking.

In other embodiments, the primary and secondary devices pair with one another locally rather than through the verification platform. In such embodiments, the primary and secondary devices connect to one another using Bluetooth or a Near Field Communication (NFC) interface. For example, a user may have a smartphone which connects to a wearable verification device. The wearable verification device includes firmware and provides key management and cryptography, making the wearable verification device suitable for use as a secure element for user verification. The wearable verification device may take a number of physical form factors, such as an adhesive label, a credit card or smartcard, key fob, tag, smartwatch or other wearable device with an embedded processing device.

The primary device 702 in the FIG. 7 embodiment may be viewed as the first user device in other embodiments described herein.

In some embodiments, other types of verification in addition to or in place of the above-described voice, face, location, motion and third party verification can be used. For example, numeric token verification or approve/decline verification may be used. Numeric token verification can be implemented by sending digits to the secondary device. The digits must then be entered into the primary device within a predetermined length of time to determine verification. Approve/decline verification can be implemented by sending a message with the option to either approve or decline to the secondary device. From the secondary device, a user can allow verification by selecting approve or can deny verification by selecting decline. Other types of verification based on behavioral knowledge, gestures, colors or other types of information may be used, in any combination.

The communication system 700 or portions thereof may be implemented using one or more processing platforms. For example, verification platform 705 may be implemented on a processing platform comprising a plurality of networked processing devices. An example of such a processing platform is processing platform 800 shown in FIG. 8.

Figure 8:
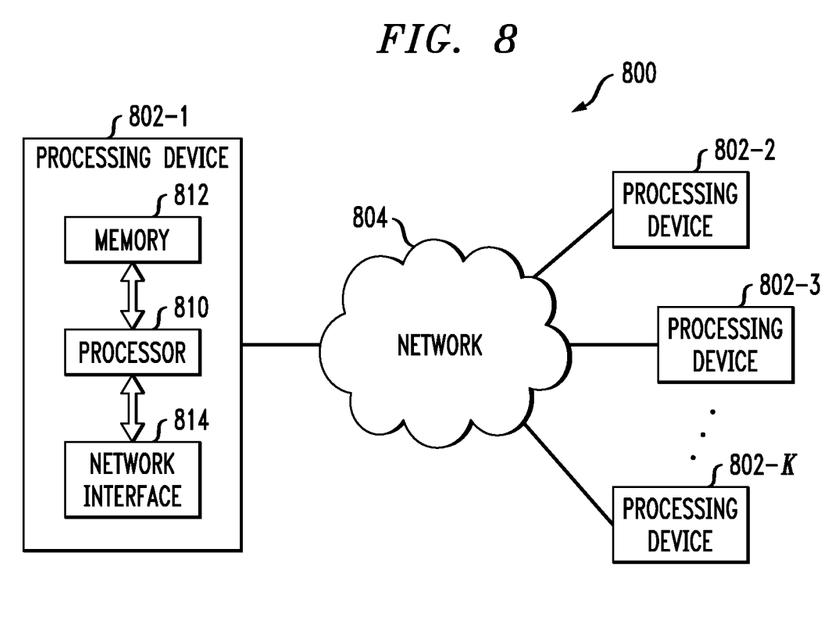
FIG. 8 shows an example of a processing platform comprising a set of networked processing devices that may be utilized to implement at least a portion of the communication system of FIG. 7.

The processing platform 800 in this embodiment comprises a portion of system 700 and includes a plurality of processing devices, denoted 802-1, 802-2, 802-3, . . . 802-K, which communicate with one another over a network 804.

The network 804 may comprise any type of network, including by way of example a global computer network such as the Internet, a wide area network (WAN), a local area network (LAN), a satellite network, a telephone or cable network, a cellular network, a wireless network such as WiFi or WiMAX, or various portions or combinations of these and other types of networks.

The processing device 802-1 in the processing platform 800 comprises a processor 810 coupled to a memory 812. The processor 810 may comprise a microprocessor, a microcontroller, an application-specific integrated circuit (ASIC), a field-programmable gate array (FPGA) or other type of processing circuitry, as well as portions or combinations of such circuitry elements, and the memory 812, which may be viewed as an example of a processor-readable storage medium having executable computer program code embodied therein, may comprise random access memory (RAM), read-only memory (ROM) or other types of memory, in any combination.

Also included in the processing device 802-1 is network interface circuitry 814, which is used to interface the processing device with the network 804 and other system components, and may comprise one or more conventional transceivers.

The other processing devices 802 of the processing platform 800 are assumed to be configured in a manner similar to that shown for processing device 802-1 in the figure.

Again, the particular processing platform 800 shown in the figure is presented by way of example only, and communication system 700 may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the communication system 700. Such components can communicate with other elements of the communication system 700 over any type of network or other communication media.

As indicated previously, components of a communication system as disclosed herein can be implemented at least in part in the form of one or more software programs stored in memory and executed by a processor of a processing device such as one of the processing devices 802. As noted above, a memory or other storage device having such program code embodied therein is an example of what is more generally referred to herein as a processor-readable storage medium.

Articles of manufacture comprising such processor-readable storage media are considered embodiments of the present invention. A given such article of manufacture may comprise, for example, a storage device such as a storage disk, a storage array or an integrated circuit containing memory. The term "article of manufacture" as used herein should be understood to exclude transitory, propagating signals.

It should again be emphasized that the above-described embodiments of the invention are presented for purposes of illustration only. Many variations and other alternative embodiments may be used. For example, the particular types and arrangements of user devices, verification platforms and applications used in a given embodiment can be varied, as can the particular types of messaging or other communications exchanged between system components. Also, a wide variety of different types of verification rules, verification types, sequences and security levels may be used other than those explicitly described herein. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
    receiving a request to remove a first application from a first device, the removal request being received at a verification platform adapted for communication with the first device, the first application comprising a first watcher application configured to monitor a status of a second application on the first device;
    identifying, at the verification platform, one or more verification rules previously established by a user of the first device for processing of the removal request;
    sending a notification regarding said one or more verification rules from the verification platform;
    receiving, at the verification platform, verification input responsive to the notification; and
    granting or denying, at the verification platform, the removal request based at least in part on the received verification input;
    wherein protected application data associated with the second application is removed from the first device responsive to denial of the removal request.

2. The method of claim 1 wherein sending the notification regarding said one or more verification rules comprises sending the notification to the first device and wherein receiving verification input responsive to the notification comprises receiving the verification input from the first device.

3. The method of claim 1, wherein sending the notification regarding said one or more verification rules comprises sending the notification to a second device different than the first device and wherein receiving verification input responsive to the notification comprises receiving the verification input from the second device.

4. The method of claim 1 wherein:
    the one or more verification rules specify multiple distinct types of verification selected by the user and a sequence in which the selected types of verification are to be applied in processing the removal request;
    the multiple distinct types of verification comprise two or more of voice verification, face verification, location verification, motion verification and third party verification; and
    the sequence in which the selected types of verification are to be applied comprises multiple security levels in which each such level requires satisfaction of at least one of the selected types of verification.

5. The method of claim 1 wherein the second application comprises a verification application.

6. The method of claim 1 further comprising the verification platform instructing an operating system of the first device to at least one of lock the first device and reboot the first device responsive to denial of the removal request.

7. The method of claim 1 further comprising resetting a password associated with a user of the first device responsive to denial of the removal request.

8. The method of claim 1 further comprising sending a notification of the granting or denying of the removal request from the verification platform to a verification agent running on the first device, wherein the verification agent controls removal of the first application and protected application data on the first device responsive to said notification of the granting or denying.

9. The method of claim 1, wherein the second application comprises a second watcher application configured to monitor the status of the first watcher application.

10. A method comprising:
    receiving a request to remove a given application from a first device, the removal request being received at a verification platform adapted for communication with the first device;
    identifying, at the verification platform, one or more verification rules previously established by a user of the first device for processing of the removal request;
    sending a notification regarding said one or more verification rules from the verification platform;

receiving, at the verification platform, verification input responsive to the notification; and granting or denying, at the verification platform, the removal request based at least in part on the received verification input;

wherein protected application data is removed from the first device responsive to denial of the removal request; and wherein the given application comprises a first watcher application configured to monitor requests to stop or remove a second watcher application.

11. An article of manufacture comprising a processor-readable storage medium having embodied therein one or more software programs, wherein the one or more software programs when executed by at least one processing device cause the at least one processing device:

to receive a request to remove a first application from a first device, the removal request being received at a verification platform adapted for communication with the first device, the first application comprising a first watcher application configured to monitor a status of a second application on the first device;

to identify, at the verification platform, one or more verification rules previously established by a user of the first device for processing of the removal request;

to send a notification regarding said one or more verification rules from the verification platform;

to receive, at the verification platform, verification input responsive to the notification; and to grant or deny, at the verification platform, the removal request based at least in part on the received verification input;

wherein protected application data associated with the second application is removed from the first device responsive to denial of the removal request.

12. An apparatus comprising:

a verification platform comprising at least one processing device having a processor coupled to a memory, the verification platform being adapted for communication with a first device;

wherein the verification platform is configured:

to receive a request to remove a first application from the first device, the first application comprising a first watcher application configured to monitor a status of a second application on the first device;

to identify one or more verification rules previously established by a user of the first device for processing of the removal request;

to send a notification regarding said one or more verification rules;

to receive verification input responsive to the notification; and to grant or deny the removal request based at least in part on the received verification input;

wherein protected application data associated with the second application is removed from the first device responsive to denial of the removal request.

13. The apparatus of claim 12 wherein the verification platform comprises:

an application programming interface adapted for communication with a verification agent implemented on the first device; and a server coupled to the application programming interface.

14. A communication system comprising the apparatus of claim 12 and a plurality of user devices including the first device.

15. A method comprising:

receiving a request from a user to remove a first application from a first device, the first application comprising a first watcher application configured to monitor a status of a second application on the first device;

sending the removal request to a verification platform;

removing the given application responsive to the verification platform granting the removal request; and removing protected application data associated with the second application from the first device responsive to the verification platform denying the removal request;

wherein the verification platform grants or denies the removal request based at least in part on verification input, the verification input being based on one or more verification rules previously established by a user of the first device for processing of the removal request.

16. The method of claim 15 further comprising at least one of locking the first device and rebooting the first device responsive to the verification platform denying the removal request.

17. The method of claim 15 further comprising resetting a password associated with a user of the first device responsive to the verification platform denying the removal request.

18. The method of claim 15 wherein the given application comprises a verification application.

19. The method of claim 15, wherein the second application comprises a second watcher application and wherein the first watcher application is configured to monitor requests to stop or remove the second watcher application, the first and second watcher applications running on the first device.

20. The method of claim 15, wherein the second application comprises a second watcher application configured to monitor the status of the first watcher application.

* * * * *